United States Patent
Chen et al.

(10) Patent No.: US 8,766,163 B2
(45) Date of Patent: Jul. 1, 2014

(54) CONTROL CIRCUIT AND OPERATION METHOD FOR PROJECTOR

(75) Inventors: Jung-Chi Chen, Hsin-Chu (TW); Po-Yen Wu, Hsin-Chu (TW); Chih-Lin Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 317 days.

(21) Appl. No.: 13/401,010

(22) Filed: Feb. 21, 2012

(65) Prior Publication Data

US 2012/0228479 A1     Sep. 13, 2012

(30) Foreign Application Priority Data

Mar. 11, 2011 (CN) ............. 2011 1 0062156

(51) Int. Cl.
   *G01J 1/44*         (2006.01)
(52) U.S. Cl.
   USPC .................................................. 250/214 C
(58) Field of Classification Search
   USPC .................................................. 250/214 C
   See application file for complete search history.

(56) References Cited

U.S. PATENT DOCUMENTS

| 7,367,678 B2 | 5/2008 | Kobayashi |
| 2006/0256406 A1 | 11/2006 | Huang et al. |

FOREIGN PATENT DOCUMENTS

TW    I303712    8/2007

*Primary Examiner* — Thanh Luu
*Assistant Examiner* — Renee Naphas
(74) *Attorney, Agent, or Firm* — WPAT, PC; Justin King

(57) ABSTRACT

A control circuit is applied into a projector and an operation method is provided for the projector. The projector includes a photo sensor provided for generating a sensing voltage according to light intensity sensed by the photo sensor. The control circuit includes a first voltage-comparing unit, a reference voltage generating unit and a second voltage-comparing unit. The first voltage-comparing unit is provided for comparing the sensing voltage and a first reference voltage, to generate a first comprising result. The reference-voltage generating unit is provided for generating a second reference voltage and determining whether adjusting the second reference voltage according to the first comparing result. The second reference voltage is relatively larger than the first reference voltage. The second voltage-comparing unit is provided for comparing the sensing voltage and the second reference voltage, to generate a second comparing result.

12 Claims, 3 Drawing Sheets

CONTROL CIRCUIT AND OPERATION METHOD FOR PROJECTOR

FIELD OF THE INVENTION

The invention relates to a control circuit, and more particularly to a control circuit applied into a projector and an operation method for the projector.

BACKGROUND OF THE INVENTION

Dustproof mechanism for a projector generally uses a filter mesh to prevent dust from entering the projector, or uses a fan to operate at the start-up stage of the projector for blowing off the dust. However, the above dustproof mechanism is passive, and the user cannot know how much the dust in the projector is and when should replace the filter mesh. Therefore, the user is only able to replace the filter mesh according to a regulation cycle. However, sometimes there is much dust in the projector but does not reach the cycle time for replacing the filter mesh, thus it results in much dust in the projector and the projector is prone to be damaged. Alternatively, sometimes there is little dust but reaches the cycle time for replacing the filter mesh, thus it will greatly waste the filter meshes.

FIG. 1 is a partial schematic circuit view of a conventional projector. Referring to FIG. 1, the conventional projector mainly includes a color wheel 102, a photo sensor 104, a voltage-comparing circuit 106 and a main circuit 108. The photo sensor 104 is provided for sensing the light intensity and detecting a position of an index mark affixed to the color wheel 102 to generate a sensing voltage SV. The voltage-comparing circuit 106 is electrically coupled between a power voltage VCC and a ground voltage GND, and the voltage-comparing circuit 106 has a resistor 106-2, a resistor 106-4 and a comparator 106-6. The voltage-comparing circuit 106 is provided for comparing the sensing voltage SV and a reference voltage RV to generate a comparing result CR. The main circuit 108 not only takes in charge of the operation of the projector, but also determines whether turning off the projector according to the comparing result CR.

When the amount of the dust covered on the photo sensor 104 does not reach a predetermined value, the photo sensor 104 still can sense certain light intensity, and the sensing voltage SV generated by the photo sensor 104 is relatively smaller than the reference voltage RV. Therefore, the main circuit 108 allows the projector operating normally according to the comparing result CR generated by the voltage-comparing circuit 106. On the contrary, when the amount of the dust covered on the photo sensor 104 reaches the predetermined value, the photo sensor 104 cannot sense the certain light intensity, the sensing voltage SV generated by the photo sensor 104 is relatively larger than the reference voltage RV. Therefore, the main circuit 108 determines to turn off the projector according to the comparing result CR generated by the voltage-comparing circuit 106.

From the above description, in the dustproof mechanism as shown in FIG. 1, when the photo sensor 104 cannot sense the certain light intensity, the main circuit 108 determines to turn off the projector immediately, regardless of whether the projector is in use. Therefore, it is very inconvenient in use. In addition, some patents related to the projector, such as US Patent Application No. 20060256406, U.S. Pat. No. 7,367,678 and TW Patent No. I303712, are provided in recent years. However, the above conventional projectors still do not provide an effective and convenient dustproof mechanism.

SUMMARY OF THE INVENTION

The invention relates to a control circuit applied into a projector having a photo sensor, which may perform a function for sending out an alarm signal to replace a filter mesh.

The invention also relates to an operation method for a projector having a photo sensor, which performs a function for sending out an alarm signal to replace a filter mesh.

The invention provides a control circuit applied into a projector. The projector includes a photo sensor provided for generating a sensing voltage according to light intensity sensed by the photo sensor. The control circuit includes a first voltage-comparing unit, a reference voltage generating unit and a second voltage-comparing unit. The first voltage-comparing unit is provided for comparing the sensing voltage and a first reference voltage, to generate a first comparing result. The reference-voltage generating unit is provided for generating a second reference voltage and determining whether adjusting the second reference voltage according to the first comparing result. The second reference voltage is relatively larger than the first reference voltage. The second voltage-comparing unit is provided for comparing the sensing voltage and the second reference voltage, to generate a second comparing result.

In an exemplary embodiment of the invention, the first voltage-comparing unit includes a first comparator having a first positive-input terminal provided for receiving the first reference voltage, a first negative-input terminal for receiving the sensing voltage and a first output terminal provided for outputting the first comparing result.

The reference-voltage generating unit includes a control unit and a reference-voltage generating circuit. The control unit is provided for outputting a first control signal and determining an electric potential of the first control signal according to the first comparing result. The reference-voltage generating circuit is provided for generating the second reference voltage and determining whether adjusting the second reference voltage according to the electric potential of the first control signal.

The projector further includes a color wheel and a fan. The control unit is provided for outputting a second control signal and a third control signal when the sensing voltage is relatively less than the first reference voltage. The second control signal is provided for controlling the rotation of the color wheel, and the third control signal is provided for controlling a predetermined rotating period of the fan to operate for a predetermined period. In addition, the control unit is provided for outputting the third control signal and an alarm signal when the sensing voltage is relatively larger than the first reference voltage, and the third signal is provided for controlling the operation of the fan.

The reference-voltage generating circuit includes a first impedance element, a second impedance element, a third impedance element, a first transistor, an inverter and a second transistor. The first impedance element has a first terminal and a second terminal, and the first terminal of the first impedance element is electrically coupled to a power voltage. The second impedance element has a first terminal and a second terminal, and the first terminal of the second impedance element is electrically coupled to the second terminal of the first impedance element. The third impedance element has a first terminal and a second terminal, and the first terminal of the third impedance element is electrically coupled to the second terminal of the first impedance element. A node between the first impedance element and the third impedance element is provided for generating the second reference voltage, and an impedance of the second impedance element is relatively larger than the third impedance element. The first transistor has a gate terminal, a first source/drain terminal and a second source/drain terminal. The first source/drain terminal of the first transistor is electrically coupled to the second terminal of the second impedance element, the second source/drain terminal of the first transistor is electrically coupled to the ground potential, and the gate terminal of the first transistor is provided for receiving the first control signal. The inverter has an input terminal and an output terminal. The input terminal of the inverter is provided for receiving the first control signal, and the output terminal of the inverter is provided for outputting an inverting signal of the first control signal. The second transistor has a gate terminal, a first source/drain terminal and a second source/drain terminal. The first source/drain terminal of the second transistor is electrically coupled to the second terminal of the third impedance, the second source/drain terminal of the second transistor is electrically coupled to the ground potential, and the gate terminal of the second transistor is provided for receiving the inverting signal of the first control signal.

In an exemplary embodiment of the invention, the first impedance element, the second impedance element and the third impedance element include a resistor respectively.

In an exemplary embodiment of the invention, the first transistor and the second transistor include an N-type transistor respectively.

In an exemplary embodiment of the invention, the N-type transistor is an N-type metal-oxide semiconductor field-effect transistor (MOSFET).

In an exemplary embodiment of the invention, the second voltage-comparing unit includes a second comparator having a second positive-input terminal, a second negative-input terminal and a second output terminal. The second positive-input terminal of the second voltage-comparing unit is provided for receiving the second reference voltage, the second negative-input terminal of the second voltage-comparing unit is provided for receiving the sensing voltage, and the second output terminal of the second voltage-comparing unit is provided for outputting the second comparing result.

The invention also provides an operation method for a projector. The projector includes a photo sensor provided for generating a sensing voltage according to light intensity sensed by the photo sensor. The operation method includes: providing a first reference voltage and a second reference voltage, the second reference voltage being relatively larger than the first reference voltage; comparing the sensing voltage and the first reference voltage to generate a first comparing result; determining whether adjusting the second reference voltage according to the first comparing result; and comparing the sensing voltage and the second reference voltage to generate a second comparing result, and determining whether turning off the projector according to the second comparing result.

In an exemplary embodiment of the invention, the projector further includes a color wheel and a fan. The operation method further includes: controlling the rotation of the color wheel and controlling a predetermined rotating period of the fan when the sensing voltage is relatively less than the first reference voltage.

In an exemplary embodiment of the invention, the operation method further includes: controlling the fan to operate and controlling the projector to send out an alarm when the sensing voltage is relatively larger than the first reference voltage.

The above objects and advantages of the present invention will become more readily apparent to those ordinarily skilled in the art after reviewing the following detailed description and accompanying drawings.

DETAILED DESCRIPTION OF PREFERRED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
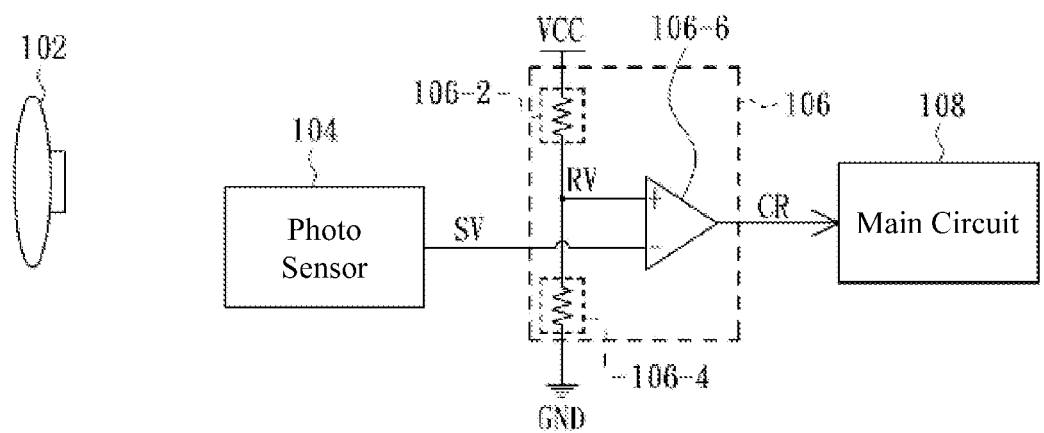
FIG. 1 is a partial schematic circuit view of a conventional projector.
Figure 2:
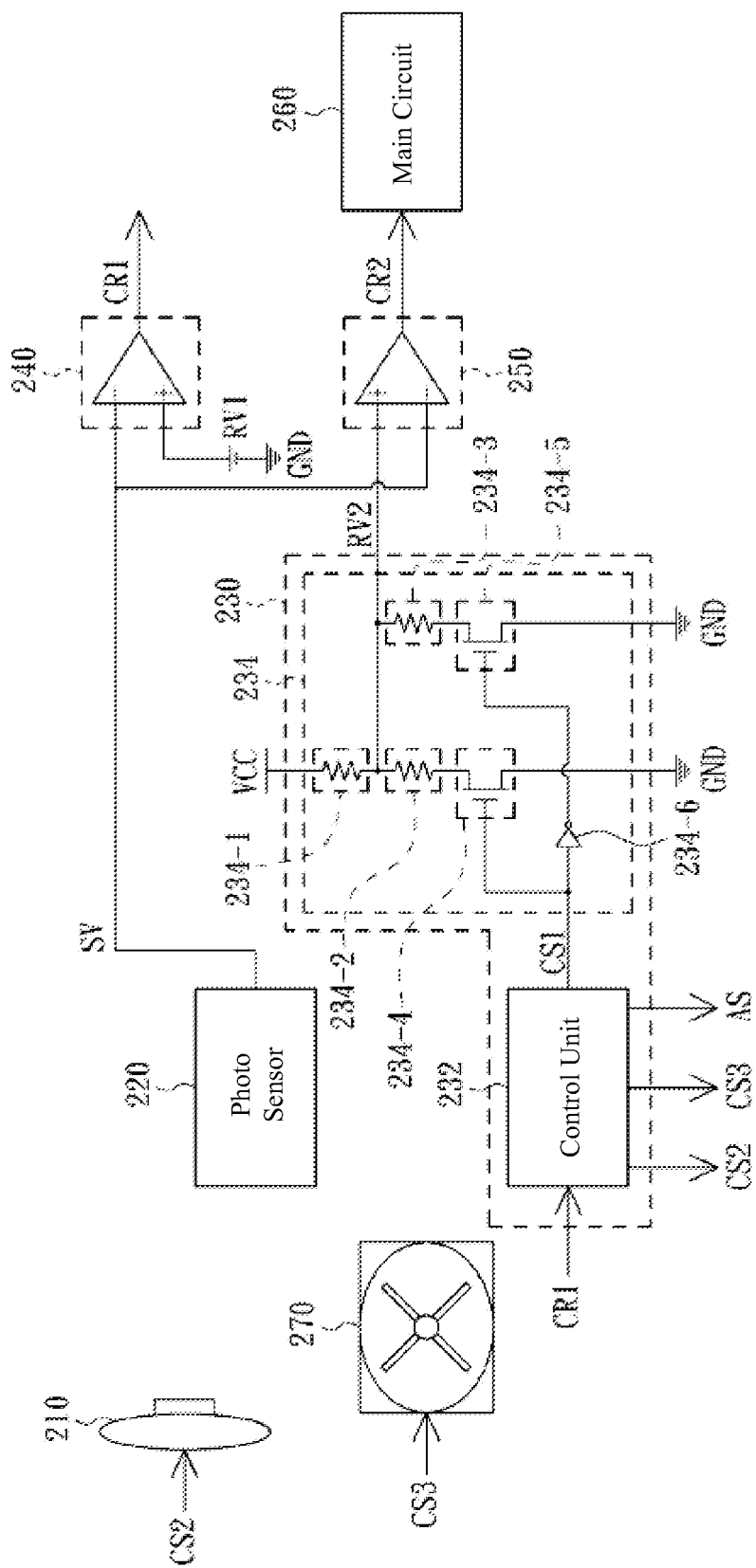
FIG. 2 is a partial schematic circuit view of a projector in accordance with an exemplary embodiment of the invention.

FIG. 2 is a partial schematic circuit view of a projector in accordance with an exemplary embodiment of the invention, and shows a control circuit of the projector. Referring to FIG. 2, the projector mainly includes a color wheel 210, a photo sensor 220, a main circuit 260 and a control circuit (not numbered) including a reference-voltage generating unit 230, a first voltage-comparing unit 240 and a second voltage-comparing unit 250.

The photo sensor 220 is provided for generating a sensing voltage SV. The photo sensor 220 senses a position of an index mark of the color wheel 210, and generates the sensing voltage SV according to the light intensity received by the photo sensor 220. However, the invention is not limited herein. The first voltage-comparing unit 240 is provided for comparing the sensing voltage SV and a first reference voltage RV1 to generate a first comparing result CR1. The first reference voltage RV1 may be provided by a voltage source. The reference-voltage generating unit 230 is provided for generating a second reference voltage RV2, and determining whether adjusting the second reference voltage RV2 according to the first comparing result CR1. The second reference voltage RV2 is relatively larger than the first reference voltage RV1, and the second reference voltage RV2 may be a threshold voltage of the main circuit 260 of the projector which is provided for determining whether turning off the projector. The second voltage-comparing unit 250 is provided for comparing the sensing voltage SV and the second reference voltage RV2 to generate a second comparing result CR2. The main circuit 260 of the projector determines whether turning off the projector according to the second comparing result CR2.

The reference-voltage generating unit 230 further comprises a control unit 232 and a reference-voltage generating circuit 234. The control unit 232 is provided for outputting a control signal CS1, and determining an electric potential of the control signal CS1 according to the first comparing result CR1. The control unit 232 may be a micro-controller unit (MCU). The reference-voltage generating circuit 234 is provided for generating the second reference voltage RV2, and determining whether and how to adjust the second reference voltage RV2 according to the electric potential of the control signal CS1. For example, the reference-voltage generating circuit 234 may determine whether raise the second reference voltage RV2.

As shown in FIG. 2, the first voltage-comparing unit 240 may be a comparator, and the comparator has a negative-input terminal for receiving the sensing voltage SV, a positive-input terminal for receiving the first reference voltage RV1, and an output terminal for outputting the first comparing result CR1. In addition, the second voltage-comparing unit 250 may be a comparator. The comparator has a positive-input terminal for receiving the second reference voltage RV2, a negative-input terminal for receiving the sensing voltage SV, and an output terminal for outputting the second comparing result CR2.

As shown in FIG. 2, the reference-voltage generating circuit 234 may include an impedance element 234-1, an impedance element 234-2, an impedance element 234-3, a transistor 234-4, a transistor 234-5 and an inverter 234-6. A first terminal of the impedance element 234-1 is electrically coupled to a power voltage VCC, and a second terminal of the impedance element 234-1 is electrically coupled to a first terminal of the impedance element 234-2. The second terminal of the impedance element 234-1 is further electrically coupled to a first terminal of the impedance element 234-3, and a node between the impedance element 234-1 and the impedance element 234-3 is provided for generating the second reference voltage RV2. An impedance of the impedance element 234-2 is relatively larger than the impedance element 234-3. A first source/drain terminal of the transistor 234-4 is electrically coupled to a second terminal of the impedance element 234-2, a second source/drain terminal of the transistor 234-4 is electrically coupled to a ground potential GND, and a gate terminal of the transistor 234-4 is provided for receiving the control signal CS1. An input terminal of the inverter 234-6 is provided for receiving the control signal CS1, and an output terminal of the inverter 234-6 is provided for outputting an inverting signal of the control signal CS1. A first source/drain terminal of the transistor 234-5 is electrically coupled to a second terminal of the resistor 234-3, and a second source/drain terminal of the transistor 234-5 is electrically coupled to a ground potential GND, and a gate terminal of the transistor 234-5 is provided for receiving the inverting signal of the control signal CS1.

The impedance element 234-1, the impedance element 234-2 and the impedance element 234-3 may be performed by a resistor respectively. Since the impedance element 234-2 is relatively larger than the impedance element 234-3, the value of the resistor used as the impedance element 234-2 is relatively larger than that of the resistor used as the impedance element 234-3. In addition, the transistor 234-4 and the transistor 234-5 may be performed by a N-type transistor respectively, such as a N-type Metal-Oxide Semiconductor Field-Effect Transistor (N-type MOSFET).

Referring to FIG. 2, when the first voltage-comparing unit 240 judges that the sensing voltage SV being relatively less than the first reference voltage RV1, the control unit 232 determines that the outputted control signal CS1 is in a low electric potential according to the first comparing result CR1. Therefore, the transistor 234-4 is in an off state. Since the inverting signal of the control signal CS1 is inverted from the control signal CS1 by the inverter 234-6 and is in a high electric potential, the transistor 234-5 is in an on state. Thus, the current provided by the power voltage VCC passes through the impedance element 234-1, the impedance element 234-3 and the transistor 234-5 to the ground potential GND in sequence. Therefore, the original second reference voltage RV2 is generated by a dividing-voltage effect among the impedance element 234-1, the impedance element 234-3 and the transistor 234-5. The second voltage-comparing unit 250 judges that the sensing voltage SV is relatively less than the second reference voltage RV2, and generates the second comparing result CR2. The main circuit 260 determines that the projector is able to normally operate according to the above second comparing result CR2.

However, when the amount of the dust covered on the photo sensor 220 increases gradually and the sensing voltage SV generated by the photo sensor 220 is increased correspondingly until the first voltage-comparing unit 240 judges that the sensing voltage SV is relatively larger than the first reference voltage RV1, the control unit 232 determines that the outputted control signal CS1 is in the high electric potential according to the first comparing result CR1, such that the transistor 234-4 is in the on state. On the contrary, the control signal CS1 is inverted to the inverting signal by the inverter 234-6 and is in the low electric potential, thus the transistor 234-5 is in the off state. Therefore, the current provided by the power voltage VCC passes through the impedance element 234-1, the impedance element 234-2 and the transistor 234-4 to the ground potential GND in sequence. Since the value of the impedance element 234-2 is relatively larger than that of the impedance element 234-3, the electric potential of the second reference voltage RV2 is increased by the dividing-voltage effect among the impedance element 234-1, the impedance element 234-2 and the transistor 234-4. That is, a threshold voltage which is used to determine whether turning off the projector is increased.

Therefore, the second voltage-comparing unit 250 still determines that the sensing voltage SV is relatively larger than the second reference voltage RV2 at the moment, and generates the second comparing result CR2 correspondingly. The main circuit 260 keeps the projector operating normally according to the second comparing result CR2. Thus, the user can replace the filter meshes and perform the dust-removing operation before the second comparing unit 250 judges that the sensing voltage SV is larger than the increased second reference voltage RV2 since the sensing voltage SV is increased with increasing amount of the dust covered on the photo sensor 220.

In addition, the projector further comprises a fan 270. The control unit 232 controls the operation of the color wheel 210 and the fan 270. For example, at the start-up stage of the projector, if the sensing voltage SV is relatively less than the first reference voltage RV1, the control unit 232 further outputs control signals CS2 and CS3. The control signal CS2 is provided for controlling the rotation of the color wheel 210, and the control signal CS3 is provided for controlling a predetermined rotating period of the fan 270. When the sensing voltage SV is larger than the first reference voltage RV1, the control unit 232 further outputs a control signal CS3 and an alarm signal AS. According to the alarm signal AS, the projector sends out an alarm, such as sending out a voice alarm, illumining an alarm light or displaying an alarm image on a screen.

Figure 3:
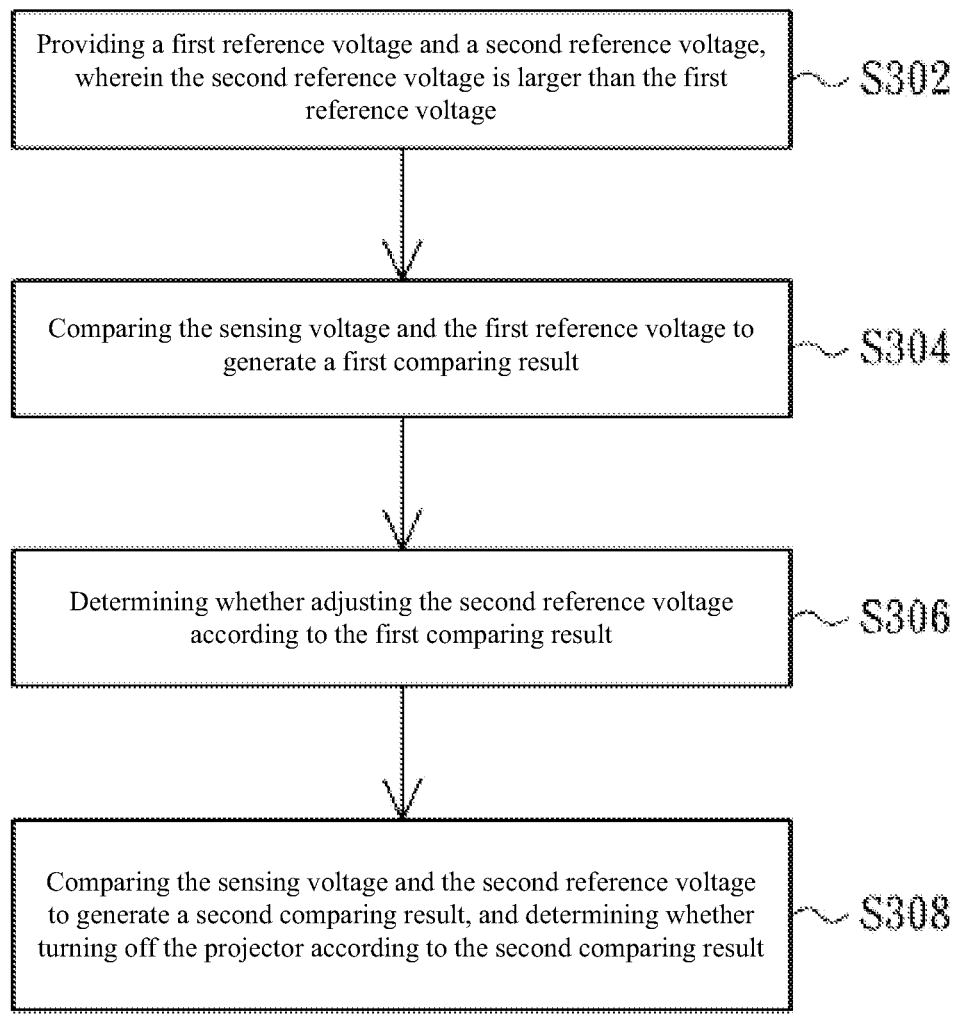
FIG. 3 is a flow chart of an operation method of a projector in accordance with an exemplary embodiment of the invention.

FIG. 3 is a flow chart of an operation method of a projector in accordance with an exemplary embodiment of the invention. The projector includes a photo sensor provided for generating a sensing voltage according to light intensity sensed by the photo sensor. Referring to FIG. 3, the operation method includes: providing a first reference voltage and a second reference voltage, wherein the second reference voltage is relatively larger than the first reference voltage (step S302);

comparing the sensing voltage and the first reference voltage to generate a first comparing result (step S304); determining whether adjusting the second reference voltage according to the first comparing result (step S306); and comparing the sensing voltage and the second reference voltage to generate a second comparing result, and determining whether turning off the projector according to the second comparing result (step S308).

In addition, when the projector further includes a color wheel and a fan, the operation method may further include: controlling the color wheel to rotate and controlling the fan to operate for a predetermined period when the sensing voltage is relatively less than the first reference voltage; and controlling the rotation of the fan and controlling the projector to send out an alarm when the sensing voltage is relatively larger than the first reference voltage.

In summary, the control unit of the invention employs the first and second voltage-comparing units and the reference-voltage generating unit. The invention uses the reference-voltage generating unit to generate the second reference voltage with the high electric potential. The second reference voltage is used as the threshold voltage of the main circuit of the projector provided for determining whether turning off the projector. In addition, the invention employs the first voltage-comparing unit to compare the sensing voltage generated by the photo sensor and the first reference voltage with the low electric potential so as to generate the first comparing result. The reference-voltage generating unit is provided for determining whether to arise the electric potential of the second reference voltage with the high electric potential according to the first comparing result, and the second voltage-comparing unit compares the sensing voltage generated by the photo sensor and the second reference voltage with the high electric potential to generate the second comparing result. Thus, the main circuit is able to determine whether turning off the projector according to the second comparing result.

Therefore, when the sensing voltage generated by the photo sensor is relatively larger than the first reference voltage with the low electric potential, the reference-voltage generating unit further increases the electric potential of the second reference voltage with the high electric potential which is used as the threshold voltage of the main circuit provided for determining whether turning off the projector, so as to avoid the main circuit turning off the projector immediately once the sensing voltage is relatively larger than the original threshold voltage. Furthermore, the invention also may employ the control unit to send out the alarm signal for reminding the user to replace the filter mesh. That is, the projector uses the control circuit to avoid the main circuit turning off the projector immediately once the photo sensor cannot sense the certain light intensity.

In addition, "first" and "second" in the first voltage-comparing unit, the second voltage-comparing unit, the first comparing result, the second comparing result, the first reference voltage, and the second reference voltage, etc., described in the present invention only represent the names of the elements, and are not used to limit the amount of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control circuit applied into a projector, the projector comprising a photo sensor provided for generating a sensing voltage according to light intensity sensed by the photo sensor, the control circuit comprising:
   a first voltage-comparing unit provided for comparing the sensing voltage and a first reference voltage, to generate a first comparing result;
   a reference-voltage generating unit provided for generating a second reference voltage and determining whether adjusting the second reference voltage according to the first comparing result, wherein the second reference voltage is relatively larger than the first reference voltage; and
   a second voltage-comparing unit provided for comparing the sensing voltage and the second reference voltage, to generate a second comparing result for determining whether to turn off the projector according to the second comparing result.

2. The control circuit according to claim 1, wherein the first voltage-comparing unit comprises a first comparator having a first positive-input terminal provided for receiving the first reference voltage, a first negative-input terminal provided for receiving the sensing voltage and a first output terminal provided for outputting the first comparing result.

3. The control circuit according to claim 1, wherein the reference-voltage generating unit comprises:
   a control unit provided for outputting a first control signal and determining an electric potential of the first control signal according to the first comparing result; and
   a reference-voltage generating circuit provided for generating the second reference voltage and determining whether adjusting the second reference voltage according to the potential of the first control signal.

4. The control circuit according to claim 3, wherein the projector further comprises a color wheel and a fan, the control unit provided for outputting a second control signal and a third control signal when the sensing voltage is relatively less than the first reference voltage, the second control signal provided for controlling a rotation of the color wheel, and the third control signal provided for controlling a predetermined rotating period of the fan; the control unit provided for outputting the third control signal and an alarm signal when the sensing voltage is relatively larger than the first reference voltage, and the third signal provided for controlling the operation of the fan.

5. The control circuit according to claim 3, wherein the reference-voltage generating circuit comprises:
   a first impedance element having a first terminal and a second terminal, the first terminal of the first impedance being electrically coupled to a power voltage;
   a second impedance element having a first terminal and a second terminal, the first terminal of the second impedance element being electrically coupled to the second terminal of the first impedance element;
   a third impedance element having a first terminal and a second terminal, the first terminal of the third impedance element being electrically coupled to the second terminal of the first impedance element, a node between the first impedance element and the third impedance element being provided for generating the second reference voltage, and an impedance of the second impedance element being relatively larger than that of the third impedance element;
   a first transistor having a gate terminal, a first source/drain terminal and a second source/drain terminal, the first source/drain terminal of the first transistor being electrically coupled to the second terminal of the second impedance element, the second source/drain terminal of the first transistor being electrically coupled to the ground potential, and the gate terminal of the first transistor being provided for receiving the first control signal;
   an inverter having an input terminal and an output terminal, the input terminal of the inverter being provided for receiving the first control signal, and the output terminal of the inverter being provided for outputting an inverting signal of the first control signal; and
   a second transistor having a gate terminal, a first source/drain terminal and a second source/drain terminal, the first source/drain terminal of the second transistor being electrically coupled to the second terminal of the third impedance element, the second source/drain terminal of the second transistor being electrically coupled to the ground potential, and the gate terminal of the second transistor being provided for receiving the inverting signal of the first control signal.

6. The control circuit according to claim 5, wherein the first impedance element, the second impedance element and the third impedance element comprise a resistor respectively.

7. The control circuit according to claim 5, wherein the first transistor and the second transistor comprise an N-type transistor respectively.

8. The control circuit according to claim 7, wherein the N-type transistor is an N-type metal-oxide semiconductor field-effect transistor (MOSFET).

9. The control circuit according to claim 1, wherein the second voltage-comparing unit comprises a second comparator having a second positive-input terminal provided for receiving the second reference voltage, a second negative-input terminal provided for receiving the sensing voltage and a second output terminal provided for outputting the second comparing result.

10. An operation method for a projector, the projector comprising a photo sensor provided for generating a sensing voltage according to light intensity sensed by the photo sensor, the operation method comprising:
    providing a first reference voltage and a second reference voltage, the second reference voltage being relatively larger than the first reference voltage;
    comparing the sensing voltage and the first reference voltage to generate a first comparing result;
    determining whether adjusting the second reference voltage according to the first comparing result; and
    comparing the sensing voltage and the second reference voltage to generate a second comparing result, and determining whether to turn off the projector according to the second comparing result.

11. The operation method according to claim 10, wherein the projector further comprises a color wheel and a fan, and the operation method further comprises:
    controlling the color wheel to rotate and controlling the fan to operate for a predetermined period when the sensing voltage is relatively less than the first reference voltage.

12. The operation method according to claim 10, further comprising:
    controlling the fan to operate and controlling the projector to send out an alarm signal when the sensing voltage is relatively larger than the first reference voltage.

* * * * *